United States Patent
Finot et al.

(10) Patent No.: US 9,612,409 B2
(45) Date of Patent: Apr. 4, 2017

(54) HERMETIC SEALING OF OPTICAL MODULE

(75) Inventors: Marc A. Finot, Palo Alto, CA (US); Rickie C. Lake, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1082 days.

(21) Appl. No.: 10/663,242

(22) Filed: Sep. 15, 2003

(65) Prior Publication Data

US 2005/0058411 A1    Mar. 17, 2005

(51) Int. Cl.
    G02B 6/42    (2006.01)

(52) U.S. Cl.
    CPC ......... *G02B 6/4201* (2013.01); *G02B 6/4248* (2013.01)

(58) Field of Classification Search
    USPC ............ 385/88–94; 372/6, 32; 250/257
    See application file for complete search history.

(56) References Cited

U.S. PATENT DOCUMENTS

| | | | | |
|---|---|---|---|---|
| 4,722,586 A * | 2/1988 | Dodson | ............... | G02B 6/4202 250/227.24 |
| 4,904,046 A * | 2/1990 | Paschke | ............... | G02B 6/4248 385/138 |
| 5,011,256 A * | 4/1991 | Johnson | ............... | G02B 6/4202 250/227.17 |
| 5,550,398 A * | 8/1996 | Kocian et al. | ............... | 257/434 |
| 5,671,315 A * | 9/1997 | Tabuchi | ............... | G02B 6/4208 385/137 |
| 6,207,950 B1 * | 3/2001 | Verdiell | ............... | 250/239 |
| 6,220,766 B1 * | 4/2001 | Yeandle | ............... | G02B 6/3861 385/138 |
| 6,227,724 B1 * | 5/2001 | Verdiell | ............... | G02B 6/4201 385/90 |
| 6,443,632 B2 * | 9/2002 | Ando | ............... | 385/94 |
| 6,445,867 B1 * | 9/2002 | Gilliland | ............... | G02B 6/3825 385/134 |
| 6,467,972 B2 * | 10/2002 | Setoguchi | ............... | G02B 6/421 385/88 |
| 6,632,027 B1 * | 10/2003 | Yoshida | ............... | G02B 6/4277 385/88 |
| 6,739,764 B2 * | 5/2004 | Ido | ............... | G02B 6/421 385/88 |
| 6,821,032 B2 * | 11/2004 | Lake | ............... | G02B 6/4248 385/92 |

(Continued)

OTHER PUBLICATIONS

"Automating Assembly of Optoelectronic Components," Abstract of Internet Article, EP&P, Jun. 1, 2002.

*Primary Examiner* — Michelle R Connelly

(74) *Attorney, Agent, or Firm* — Blakely, Sokoloff, Taylor & Zafman LLP

(57) ABSTRACT

A hermetically sealable package may be formed from a top portion and a bottom portion mated along a seam at or near a plane of an optical fiber. A completed pill assembly may be positioned directly into the enclosure base without requiring the fiber to be threaded through the feed through or "snout". The top potion may then be mated with the bottom portion to form the package. A glass solder ring may be placed coaxial with the fiber in the feed through. The seam may be sealed by laser welding and the glass solder ring reflowed by laser heating, for example, with a same laser as used to weld the seam or by resistive or induction heating.

18 Claims, 7 Drawing Sheets

(56) References Cited

U.S. PATENT DOCUMENTS

| | | | |
|---|---|---|---|
| 6,846,113 B2* | 1/2005 | Yeh | G02B 6/4238 |
| | | | 385/88 |
| 6,944,374 B2* | 9/2005 | Skull | G02B 6/0218 |
| | | | 385/137 |
| 7,263,266 B2* | 8/2007 | Williamson | G02B 6/4238 |
| | | | 385/137 |
| 2002/0060840 A1* | 5/2002 | Tatoh | G02B 6/4201 |
| | | | 359/341.1 |
| 2002/0110344 A1* | 8/2002 | Jin | G02B 6/4248 |
| | | | 385/138 |
| 2003/0068141 A1* | 4/2003 | Velsher | G02B 6/4248 |
| | | | 385/92 |
| 2003/0081914 A1* | 5/2003 | Steinberg et al. | 385/94 |
| 2003/0165305 A1* | 9/2003 | Dallas | G02B 6/4201 |
| | | | 385/92 |
| 2003/0223709 A1* | 12/2003 | Lake et al. | 385/94 |
| 2004/0114884 A1* | 6/2004 | Shinde | G02B 6/4201 |
| | | | 385/94 |
| 2004/0240804 A1* | 12/2004 | Mahapatra | G02B 6/4248 |
| | | | 385/94 |

\* cited by examiner

HERMETIC SEALING OF OPTICAL MODULE

FIELD OF THE INVENTION

An embodiment of the present invention relates to optical modules and, more particularly, to hermetically sealed optical modules.

BACKGROUND INFORMATION

Fiber optics are used for a great number of applications. Everything from communication and computing systems, test and measurement systems, and medical systems and devices make use of optical technology. Optical devices are becoming increasingly smaller and more fragile.

In particular, fiberoptic telecommunications are continually subject to demand for increased bandwidth. One way that bandwidth expansion has been accomplished is through dense wavelength division multiplexing (DWDM) wherein multiple separate data streams exist concurrently in a single optical fiber, with modulation of each data stream occurring on a different channel. Each data stream is modulated onto the output beam of a corresponding semiconductor transmitter laser operating at a specific channel wavelength, and the modulated outputs from the semiconductor lasers are combined onto a single fiber for transmission in their respective channels. The International Telecommunications Union (ITU) presently requires channel separations of approximately 0.4 nanometers, or about 50 GHz. This channel separation allows up to 128 channels to be carried by a single fiber within the bandwidth range of currently available fibers and fiber amplifiers. Improvements in fiber technology together with the ever-increasing demand for greater bandwidth will likely result in smaller channel separation in the future.

Transmitter lasers used in DWDM systems have typically been based on distributed feedback (DFB) lasers operating with a reference etalon associated in a feedback control loop, with the reference etalon defining the ITU wavelength grid. Statistical variation associated with the manufacture of individual DFB lasers results in a distribution of channel center wavelengths across the wavelength grid, and thus individual DFB transmitters are usable only for a single channel or a small number of adjacent channels. Continuously tunable external cavity lasers have been developed to overcome this problem.

The advent of continuously tunable telecommunication lasers has introduced additional complexity to telecommunication transmission systems. Particularly, the tuning aspects of such lasers involve multiple optical surfaces that are sensitive to contamination and degradation during use. Lack of adequate protective packaging may decrease performance and lifetimes for such lasers.

Optoelectronics packaging is one of the most difficult and costly operations in optoelectronics manufacturing. Process manufacturing demands like submicron alignment between optical elements, high-speed electrical connections, excellent heat dissipation, and high reliability become true challenges. Providing such features has resulted in optoelectronic packages that may be larger, costlier and more difficult to manufacture than electronic packages.

In the case of an optoelectronic modules, it is difficult to align the laser diode with the optical lens or fiber when constructing the package. The process of aligning these components to a laser diode and fixing it in place is known as fiber pig-tailing. Current designs use numerous parts in complex three-dimensional arrangements and generally need high degree of accuracy and automation.

Pig tailing typically involves sealing the module and leaving a feed-through aperture open through which the optical fiber is manually threaded. Alignment of the fiber into the closed package may be challenging. Once aligned, a seal is formed coaxial with the fiber and the feed-through aperture thus hermetically sealing the package. It may be desirable to provide a hermetically sealed module which does not require threading of the fiber through the feed through.

Package designs that lend themselves to automation have been proposed which generally involve using a package with an open top, level with the plane at which an optical fiber is to be aligned. A lid is then placed over the package and sealed in place by soldering. In such cases a fiber with a metallization coating is required to ensure proper sealing.

DETAILED DESCRIPTION

Embodiments of the invention provide hermetically sealed containers for use optical and opto-electrical modules or packages such as those used in laser systems. In its most general terms, such packages comprise an external cavity laser, and a hermetically sealable container configured to enclose the external cavity laser in an inert atmosphere thus protecting the contents from moisture and other contaminants.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
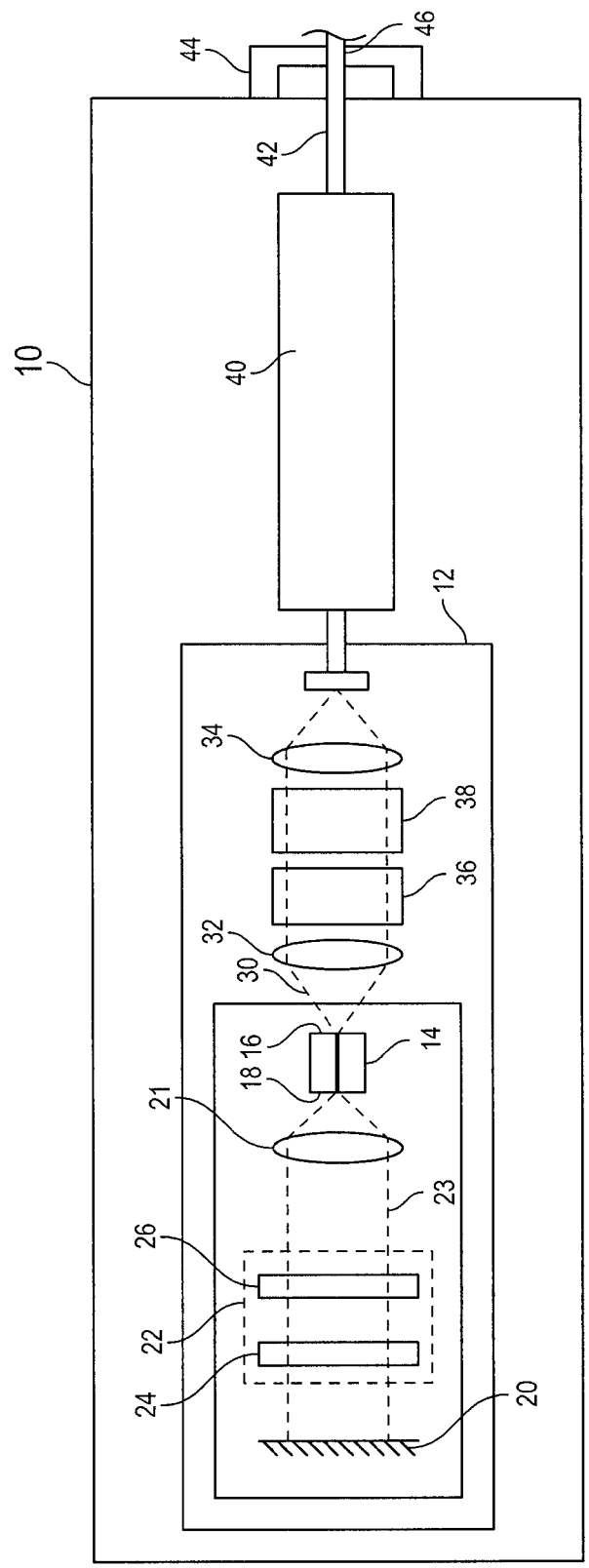
FIG. 1 is a view of a top view of a hermetically seal package housing a laser transmitter.

FIG. 1 is a top view of an example optical or optoelectrical pig-tail module 10, in this case housing an external cavity diode laser (ECDL) transmitter 12. The ECDL may comprise a laser diode 14 having a front facet 16 and a rear facet 18. An external cavity is defined by the length between the laser diode 14 and a reflector 20. The length of this cavity is adjustable to alter the lasing frequency. A lens 21 for collimating a light beam 23 from the rear facet 18 may be provided as well as a wavelength control section 22 which may include etalons 24 and 26 or other wavelength filtering devices. A light beam 30 of a particular frequency from the front facet 16 may be directed through a plurality of lenses 32 and 34 as well as other optical components such as a splitter 36 and an isolator 38. Various other components may also be coupled to the output beam 30 shown simply a block 40. An optical fiber 42 coupled to the optical components 40 exits through a metal ferrule 44. The portion of the fiber that protrudes from the module 10 may be referred to as a pig tail 46. Traditionally, the module 10 is sealed and thereafter the fiber 42 is fed through the ferrule 44.

Figure 2:
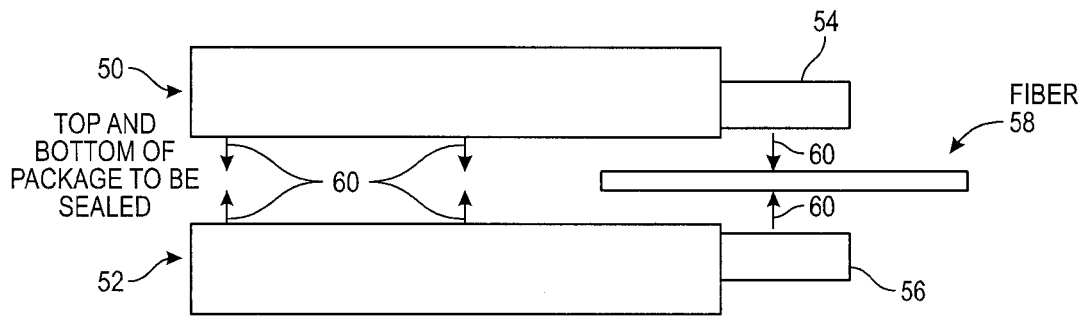
FIG. 2 is a side view of a disassembled hermetically sealable package according to an embodiment of the invention.

Referring to FIG. 2, there is shown a side view of a hermetic package according to one embodiment of the invention. The module comprises a top portion 50 and a bottom portion 52. The top portion 50 and bottom portion 52 may be made of a metallic material. A suitable material may be for example, stainless steel or an alloy such as Kovar® which is a registered trademark of Carpenter Technology Corporation and may comprise a combination of Co, Mn, Ni, Si, and Fe. Split ferrule members 54 and 56 may also be provided on the top portion 50 and bottom portion 52, respectively, which when mated form a snout. The split fiber feed through members 54 and 56 may be metallic and may be integrally formed with the top portion 50 and bottom portion 52.

The top portion 50 and bottom portion 52 are shaped to be joined at or near the plane of an optical fiber 58 to form the package. The fiber 58 may be aligned with optical components (not shown) within the bottom portion 52 with a length of the fiber protruding out of the split ferrule portion 56. In the alternative, the optical components may be in the top portion 50. Once the fiber 58 is aligned or otherwise secured to the optical components, top portion 50 and bottom portion 52 are joined together as depicted by arrows 60.

Figure 3:
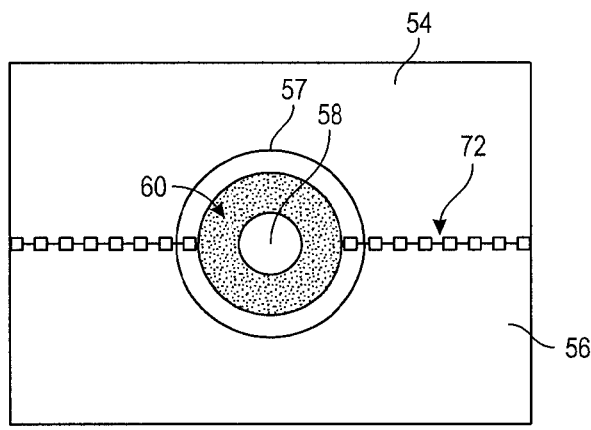
FIG. 3 is a front view looking into the fiber feed-through formed by the two enclosed halves of the hermetically sealable package according to an embodiment.

Referring to FIG. 3, the top of the ferrule 54 and the bottom of the ferrule 56 when mated form a substantially circular opening 57 for the fiber 58. A glass solder ring or glass frit 60 may be placed coaxial with the fiber 58 within the opening 57. The glass solder typically comprises a low melting point glass which is suitable for forming hermetic seals. The thermal expansion coefficient of the glass may be chosen to be between the thermal expansion coefficient of the ferrule portions 54 and 56. The glass is reflowed to form a hermetic seal. FIG. 3 shows the glass solder ring 60 in an unreflowed state.

Figure 4:
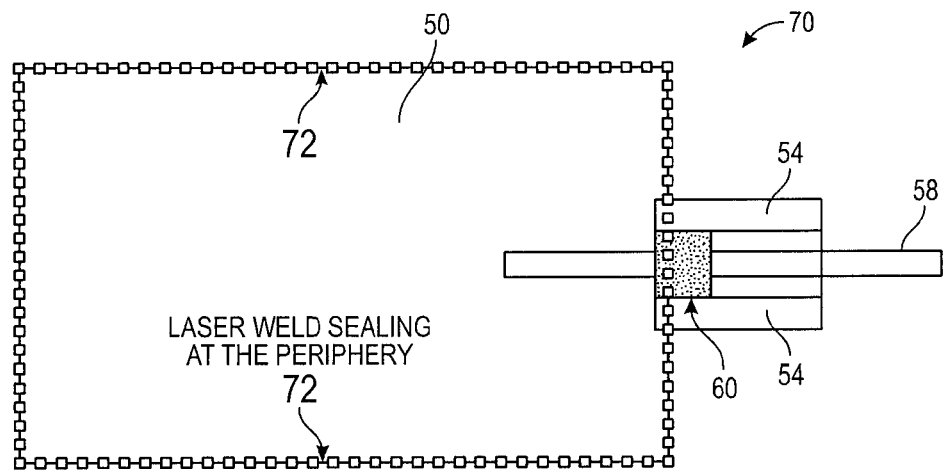
FIG. 4 is a top view of the package shown in FIGS. 2 and 3 after hermetic sealing.

FIG. 4 is a top view of the package 70 with the top portion 50 joined to the bottom portion 52. Since the top portion 50 and bottom portion 52 may be metallic, a laser weld joint may be used at the seam 72 where the top portion 50 and the bottom portion 52 meet to seal the two portions together. Laser welding may be an efficient technique for attaching metallic pieces which does not require global heating or solder. In this case a pinpointed laser beam heats the periphery of the seam 72 where the top portion 50 and bottom portion 52 are mated and causes the metals to fuse together creating a very strong bond.

Figure 5:
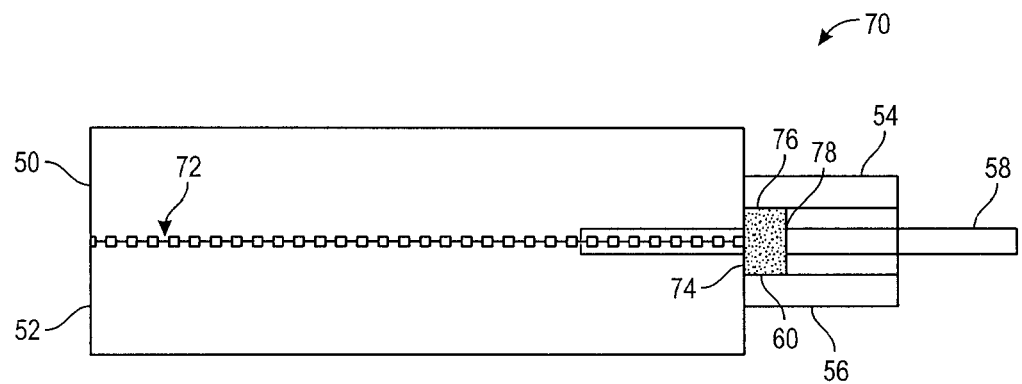
FIG. 5 is a side view of the package shown in FIG. 4.

FIG. 5 comprises a side view of the hermetically sealed package 70. According to an embodiment of the invention a combination of two hermetic sealing techniques may be used with the same type of processing tool. That is, a laser welded seam 72 forms a hermetic seal between the top portion 50 and the bottom portion 52. Local reflow of the glass solder ring 60 may also be accomplished with the same laser processing tool or by inductive or resistive heating. The area within the ferrule opening 57 comprises three different types of surfaces. After reflow, the glass solder 60 forms a hermetic seal with all three surfaces including the seam 72, which may be a KOVAR® alloyed metal-KOVAR® alloyed metal weld 74, the inner surface 76 of the KOVAR® alloyed metal ferrule comprising portions 54 and 56, and to the glass fiber interface 78. These two different techniques enable the elimination of the threading of the fiber due to the compatibility of the two joints. This enables full automation of the sealing process since the threading is very difficult to automate.

Figure 6A:
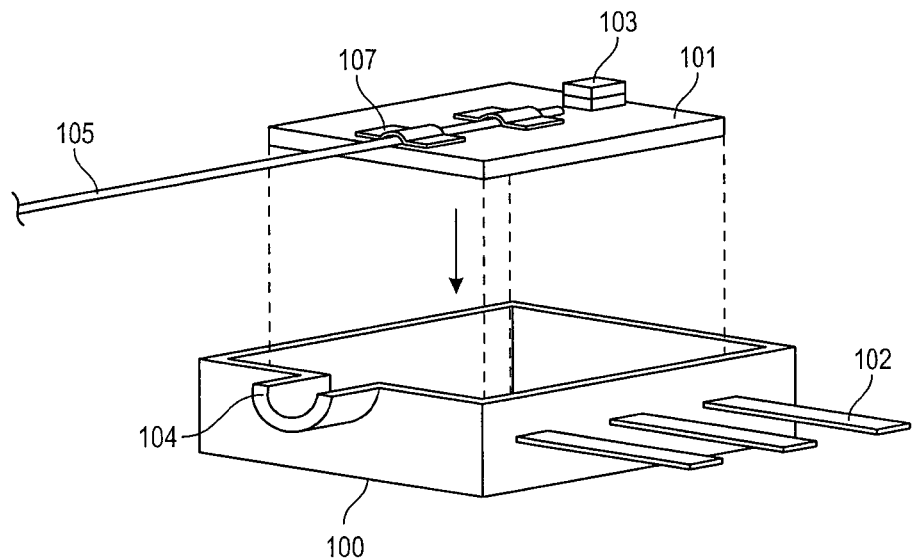
FIG. 6A is a plan view of a bottom portion of a hermetic package according to an embodiment of the invention.

FIGS. 6A-6G show yet another embodiment. Similar to the embodiment previously described, FIG. 6A shows a bottom portion 100 of the hermetic package. The package shown is generally rectangular in shape but may be any shape. The bottom portion 100 may have leads 102 to electrically connect components in the package to the outside. The front of the package comprises a short snout portion 104 acting as the feed through to accommodate an optical fiber 105. If the package houses a laser, the bottom portion 100 may further include a thermal electric cooling (TEC) device (not shown) to control the temperature of a laser. The fiber may be attached to a completed substrate assembly referred to as a "pill" 101. The pill 101 may include various components such as a laser 103 and a flexure 107 or other alignment device to fix the optical alignment of the fiber 105.

Figure 6B:
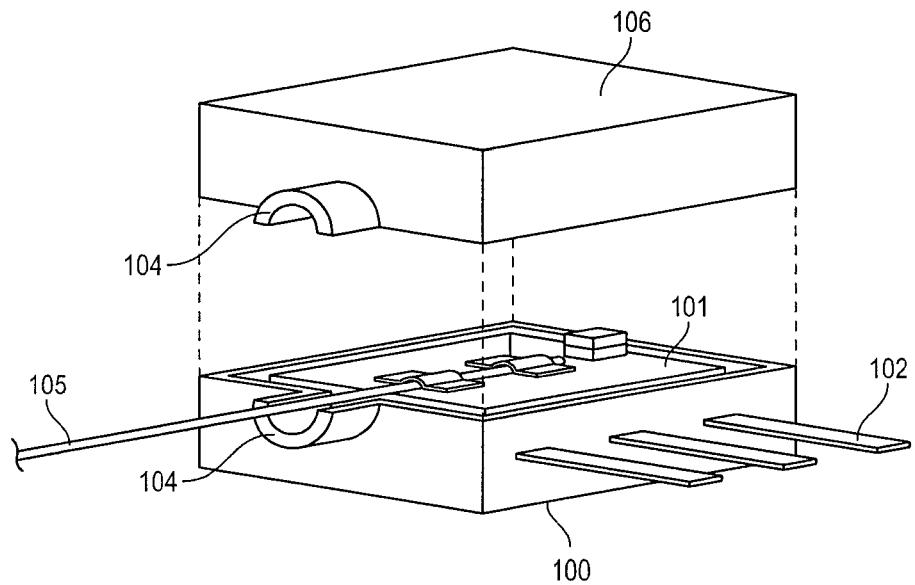
FIG. 6B is a plan view of the hermetic package as shown in FIG. 6A with the pill placed into the bottom portion.
Figure 6C:
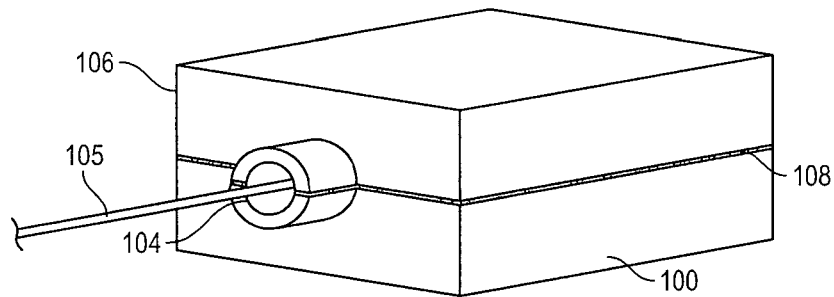
FIG. 6C is a plan view of the hermetic package shown in FIG. 6B with the top sealed to the bottom.

As shown in FIG. 6B, the fiber 105 may be placed in the bottom half of the snout 104 as shown, while the substrate assembly or pill 101 is positioned into the enclosure itself. The top portion or lid 106 may be substantially a mirror image of the bottom portion 100 and is shaped to fit over top of the bottom portion 100. Thereafter the top portion 106 and the bottom portion 100 are sealed together at a seam 108, such as by a laser weld. The seam 108 runs along the periphery of the where the top and bottom portions, 100 and 106, meet and includes the snout 104 as shown in FIG. 6C.

Figure 6D:
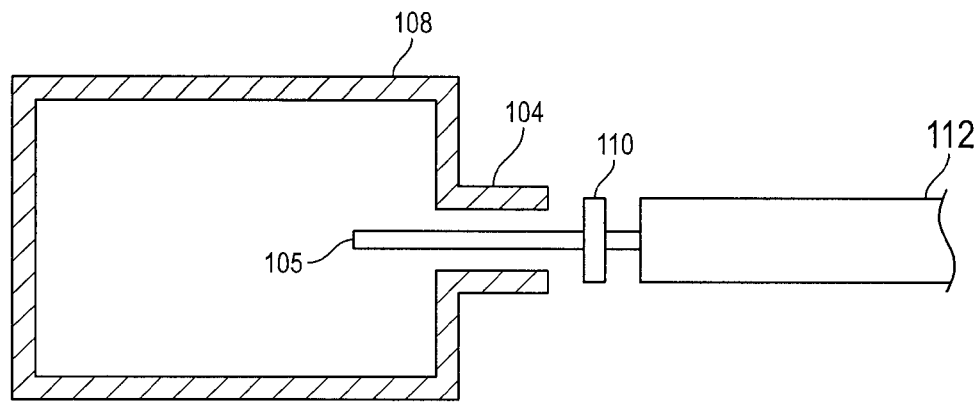
FIG. 6D is a top view top view of the hermetic package shown in FIG. 6A.

FIG. 6D is a top view of the hermetic package. A glass solder perform 110 having a generally annular shape as well as a generally cylindrical furcation tube 112 may be threaded over the fiber 105. Embodiments may employ standard 250, 400, or 900 micron fibers with an appropriate furcation tube 112 with equal ease, as no threading of the fiber through a standard fiber feedthough is required during assembly. Further, the semi-cylindrical "U" shaped cross-section of the snout 104 may be made small in diameter, as a fiber does not need to be threaded through it nor does the furcation tube 112 need to be threaded through it.

Figure 6E:
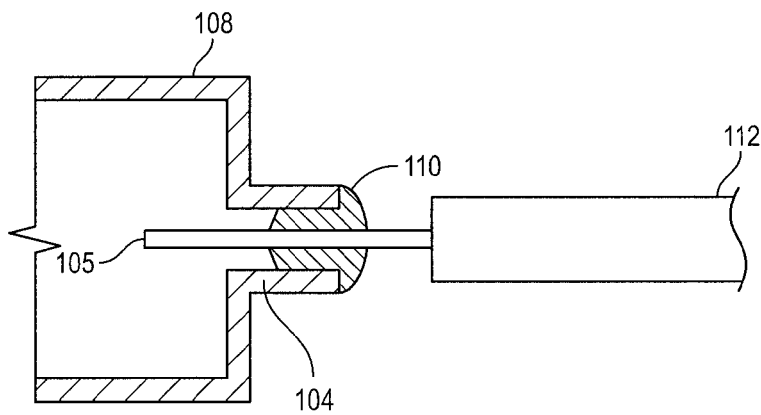
FIG. 6E is a top view of the hermetic package of FIG. 6C after fiber and enclosure hermetic sealing.

Referring to FIG. 6E, the solder perform 110 may be reflowed, such as by a laser heating to hermetically seal the package. As shown, after reflow, the a portion of the solder 110 forms a seal between the fiber 105 and the inner surface of the snout 104 and a portion of the solder covers the face of the snout 104 to form a hermetic seal. Glass solder may be preferred in this particular embodiment as any plated and solderable metallization required for metal solder alloys may be destroyed during laser welding and further may not be solderable without the used of strong, corrosive, acid type fluxes. Of course this type of flux may not be appropriate for sensitive, opto-electronic assemblies.

Figure 6F:
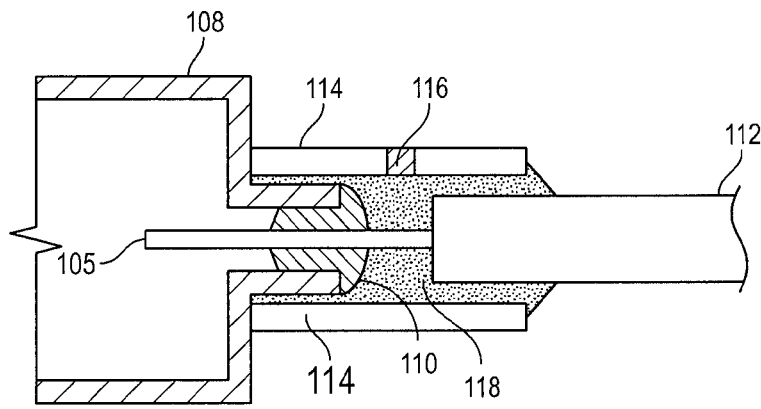
FIG. 6F is a top view of the hermetic package of FIG. 6C after hermetic sealing and installation of a coupling tube and application of epoxy.

As shown in FIG. 6F a length of coupling tubing 114, which may comprise for example stainless steel or KOVAR® alloyed metal, may be threaded over the fiber 105. This coupling tube 114 spans the space between the snout 104 and the furcation tubing 112. If the fiber had a connector, threading a coupling tube 114 over the fiber may not be possible. Thus, if a pre-connectorized fiber is used, the coupling tube 114 may be pre-threaded onto the fiber immediately prior to the glass solder perform 110. A fill hole or opening 116 in the coupling tube 114 provides an opening for introducing a material such as epoxy 118 into the area inside the coupling tube 114 to secure the snout 104 to the furcation tube 112.

Figure 6G:
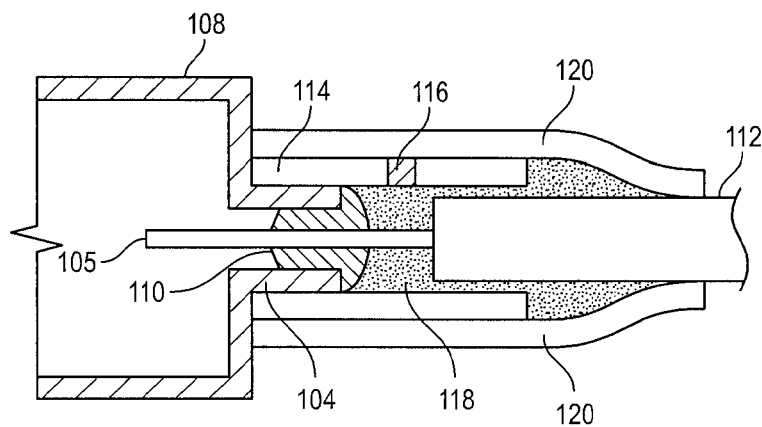
FIG. 6G is a top view of the hermetic package of FIG. 6F including a strain relief boot.

Finally, in as shown in FIG. 6G, a strain relief boot 120 may be fitted over the coupling tube 114 and the furcation tube 112. The strain relief boot 120 may be made from a flexible material to mitigate strain at the coupling tube 114 and furcation tube 112 interface that otherwise may be damaged. Further, it may be possible to integrate the coupling tube 114 and the strain relief boot 120 into a single assembly by designing the boot to be molded over and onto the coupling tube 114. In this case, the fill hole 116 may extended through the strain relief boot 120.

Figure 7A:
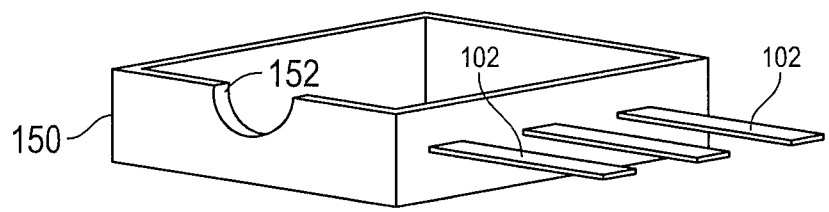
FIG. 7A is a plan view of a bottom portion of a hermetic package according another embodiment of the invention.

FIGS. 7A-D show yet another embodiment of the invention, similar to the embodiment illustrated in FIGS. 6A-F but with the integral snout 104 being omitted. Instead, as shown in FIG. 7A, the bottom portion 150 of the hermetic enclosure includes a semi-circular opening 152. Again, the periphery of the top portion 154 of the enclosure package may be substantially a mirror image of the bottom portion such that the top portion 154 mates over the bottom portion 150.

Figure 7B:
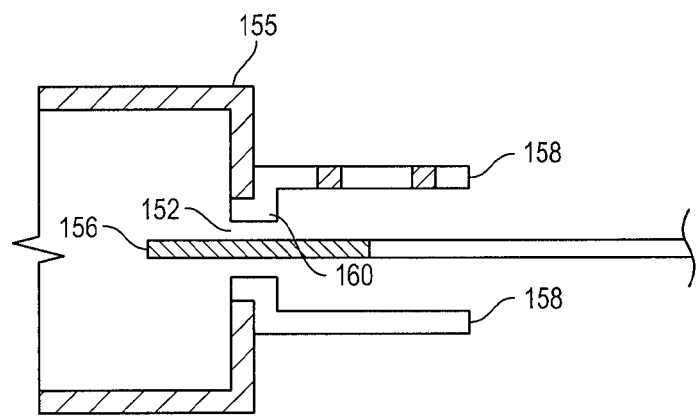
FIG. 7B is a top view of the hermetic package of FIG. 7A with a separate fiber feed through coupling/sealing tube.
Figure 7C:
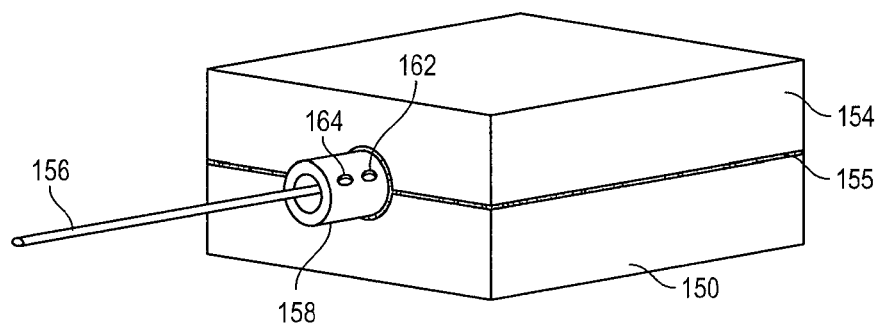
FIG. 7C is a plan view of the hermetic package of FIG. 7A with the top sealed to the bottom.

As shown in FIGS. 7B and 7C, the fiber 156 may be placed over the semi-circular opening 152 and aligned and secured relative to devices therein. Alternatively, the fiber of the completed and optically aligned pill (101 as shown in FIGS. 6A-B) may be placed into the semi-circular opening while the substrate itself is placed into the cavity of the base enclosure 150. The top portion 154 may then be placed over the bottom portion 150 forming an enclosure. A coupling tube 158, which may be for example stainless steel or KOVAR® alloyed metal, may be inserted into the hole created by the semi-circular openings 152 to form a snout which may be tack welded in place. The coupling tube 158 may be generally cylindrical but having a narrower lip 160 sized to fit within the hole created by the semi-circular openings 152. Two holes 162 and 164 may be provided in the coupling tube 158.

Figure 7D:
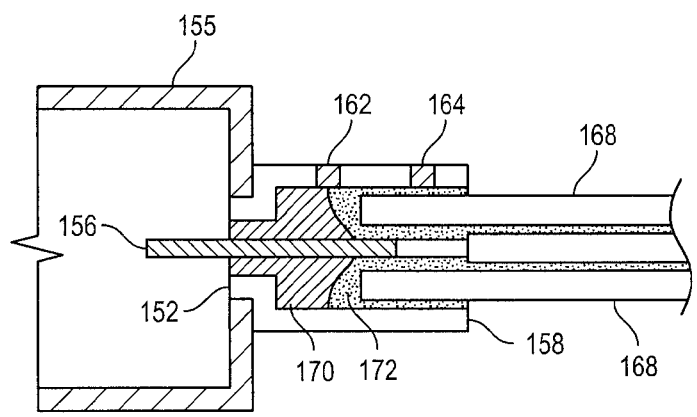
FIG. 7D is a top view of the hermetic package of FIG. 7A after hermetic sealing and installation of a protective furcation tubing over the fiber.

Referring to FIG. 7D, a solder perform 170 and a furcation tube 168 may be threaded over the fiber and inserted partially into the coupling tube or "snout" 158. The seam 155 formed at the junction of the top portion 154, the bottom portion 150, and the seam around the coupling tube 158 may be sealed together such as by laser welding. The first hole 162 may be used to reflow the solder perform 170 to solder seal the opening around the fiber thus hermetically sealing the enclosure. The solder perform 170 may be glass or a metal alloy solder. The second hole 164 may be used to provide an opening for injecting a material such as epoxy 172 to secure the coupling tube 158 to the furcation tube 168. A strain relief boot may then be added as previously discussed with reference to FIG. 6F.

Thus, according to embodiments of the invention a robust hermetic package may be provided which requires no metallization of the fiber nor does it require fiber feed through threading. Hence according to embodiments of the invention it may be possible to fully automate the hermetic sealing process in a cost effective fashion.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A hermetic package, comprising:
   a bottom portion;
   a top portion to mate over said bottom portion at a seam to form a package;
   a fiber feed through;
   an optical fiber having a first portion inside said package and a second portion outside said package extending through said feed through;
   a laser weld joint at said seam;
   a reflowed glass solder inside of said feed through coaxial with said optical fiber;
   a furcation tube around the second portion of the optical fiber outside of the package;
   a coupling tube around the feed through and around the furcation tube; and
   an epoxy securing the coupling tube to the furcation tube.

2. A hermetic package as recited in claim 1 wherein said feed through comprises:
   a top half formed with said top portion; and
   a bottom half formed with said bottom portion.

3. A hermetic package as recited in claim 2 wherein said top portion and said bottom portion comprise an alloyed metal.

4. A hermetic package as recited in claim 2 wherein said hermetic package encases an optoelectronic device.

5. A hermetic package as recited in claim 1 wherein said seam is approximately in a plane of said optical fiber.

6. A hermetic package as recited in claim 1 wherein said reflowed glass solder is reflowed by one of said laser heating, induction heating, and resistive heating.

7. A hermetically sealed optoelectronic package, comprising:

a bottom for said package;
a top for said package to mate over said bottom at a seam;
a fiber feed through;
optoelectronic components in said package;
an optical fiber having a first portion aligned with said components in said package and a second portion extending outside said package through said fiber feed through;
a laser weld joint at said seam;
a reflowed glass solder inside of said fiber feed through coaxial with said optical fiber;
a furcation tube around the second portion of the optical fiber outside of the package;
a coupling tube around the feed through and around the furcation tube; and
an epoxy securing the coupling tube to the furcation tube.

8. A hermetically sealed optoelectronic package, as recited in claim 7 wherein said fiber feed through is formed integrally with said top and said bottom.

9. A hermetically sealed optoelectronic package, as recited in claim 8 wherein said seam comprises a laser weld.

10. A hermetically sealed optoelectronic package, as recited in claim 9 wherein said reflowed glass solder is reflowed by laser heating.

11. A hermetically sealed optoelectronic package, as recited in claim 9 wherein said reflowed glass solder is reflowed by one of resistive heating and induction heating.

12. A hermetically sealed optoelectronic package, as recited in claim 7 wherein said top and said bottom comprises a metallic alloy.

13. A hermetically sealed optoelectronic package, as recited in claim 7 wherein said seam is approximately in a plane of said optical fiber.

14. A hermetic package, comprising:
a package bottom having a first generally semi-cylindrical snout;
an optical fiber having a first portion inside said package bottom and a second portion outside said package bottom through said semi-cylindrical snout;
a package top having a second generally semi-cylindrical snout to mate over said package bottom at a seam to form a package having a cylindrical snout;
a laser weld joint at said seam; solder to seal between said snout and said optical fiber;
a furcation tube on said second portion of said optical fiber;
a coupling tube around said cylindrical snout and said furcation tube; and
an epoxy to seal an area inside said coupling tube.

15. A hermetic package as recited in claim 14 wherein said coupling tube comprises an opening for introducing said epoxy.

16. A hermetic package as recited in claim 15 further comprising a strain relief boot over said coupling tube and said furcation tube.

17. A hermetic package as recited in claim 14 wherein said solder comprises a glass solder.

18. A hermetic package as recited in claim 17 wherein said fiber comprises one of a 250, 400, and 900 micron fiber.

* * * * *